US011770283B2

(12) United States Patent
Yang et al.

(10) Patent No.: US 11,770,283 B2
(45) Date of Patent: Sep. 26, 2023

(54) SELECTING THE LOCATION OF PEAK REDUCTION TONES FOR REDUCING A PEAK-TO-AVERAGE POWER RATIO OF A WIRELESS TRANSMISSION

(71) Applicant: QUALCOMM Incorporated, San Diego, CA (US)

(72) Inventors: Wei Yang, San Diego, CA (US); Saeid Sahraei, San Diego, CA (US); Gokul Sridharan, Sunnyvale, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/356,196

(22) Filed: Jun. 23, 2021

(65) Prior Publication Data

US 2021/0409251 A1 Dec. 30, 2021

Related U.S. Application Data

(60) Provisional application No. 63/046,631, filed on Jun. 30, 2020.

(51) Int. Cl.
*H04L 27/26* (2006.01)
(52) U.S. Cl.
CPC ...... *H04L 27/2618* (2013.01); *H04L 27/2615* (2013.01)

(58) Field of Classification Search
CPC .............. H04L 27/2618; H04L 27/2615; H04L 5/0053
See application file for complete search history.

(56) References Cited

U.S. PATENT DOCUMENTS

| 9,438,388 | B2* | 9/2016 | Kim | H04L 27/2649 |
|---|---|---|---|---|
| 10,069,522 | B2* | 9/2018 | Terry | H04B 7/0413 |
| 10,574,277 | B2* | 2/2020 | Terry | H04B 7/00 |
| 2009/0257366 | A1* | 10/2009 | Power | H04L 27/2603 370/280 |
| 2011/0158196 | A1* | 6/2011 | Power | H04L 1/0027 370/329 |

(Continued)

FOREIGN PATENT DOCUMENTS

| WO | WO-2018160083 A1 * | 9/2018 | ........... H03F 1/0294 |
|---|---|---|---|
| WO | WO-2021222345 A1 * | 11/2021 | ......... H04L 27/2614 |

*Primary Examiner* — Jay P Patel
(74) *Attorney, Agent, or Firm* — Shumark & Sieffert, P.A.

(57) ABSTRACT

Aspects of the disclosure relate to techniques for peak-to-average power ratio (PAPR) reduction based on a tone reservation (TR) algorithm. For a TR algorithm, a suitable subset of tones from among a full set of tones in a given resource allocation are reserved for use as peak reduction tones (PRT). An apparatus, such as a wireless communication device, selects a set of PRTs based on a deterministic pseudo-random tone selection algorithm, such as quadratic sampling, cubic sampling, or Fibonacci-type sampling. The apparatus determines a PAPR reduction waveform for transmission on the PRTs and transmits a data waveform multiplexed with the PAPR reduction waveform on resources corresponding to the resource allocation. Other aspects, embodiments, and features are also claimed and described.

26 Claims, 10 Drawing Sheets

(56) References Cited

U.S. PATENT DOCUMENTS

| | | | | |
|---|---|---|---|---|
| 2015/0155981 | A1* | 6/2015 | Kim | H04L 5/0007 |
| | | | | 375/295 |
| 2017/0163296 | A1* | 6/2017 | Terry | H04B 1/69 |
| 2017/0180168 | A1* | 6/2017 | Terry | H04L 69/22 |
| 2018/0034675 | A1* | 2/2018 | Tosato | H04L 25/03242 |
| 2021/0344543 | A1* | 11/2021 | Sahraei | H04L 27/2614 |
| 2021/0377088 | A1* | 12/2021 | Gaal | H04W 72/0453 |
| 2021/0377089 | A1* | 12/2021 | Gaal | H04L 27/2618 |

* cited by examiner

Example PRT placement within a set of tones

SELECTING THE LOCATION OF PEAK REDUCTION TONES FOR REDUCING A PEAK-TO-AVERAGE POWER RATIO OF A WIRELESS TRANSMISSION

PRIORITY CLAIM

This application claims priority to and the benefit of provisional patent application No. 63/046,631 filed in the United States Patent and Trademark Office on Jun. 30, 2020, the entire content of which is incorporated herein by reference as if fully set forth below in its entirety and for all applicable purposes.

TECHNICAL FIELD

The technology discussed below relates generally to wireless communication systems, and more particularly, to peak-to-average power reduction in a wireless transmission. Some aspects may include enabling and providing communication devices configured to select the location of peak reduction tones for reducing the peak-to-average power ratio of a wireless transmission.

INTRODUCTION

Contemporary wireless communication systems frequently employ orthogonal frequency division multiplexing (OFDM) for transmitting information over a set of closely-spaced frequency subcarriers or tones. While OFDM provides many advantages over other transmission waveforms, it can sometimes suffer from a high peak-to-average power ratio (PAPR). With many currently available radios used in wireless devices, reduction of the PAPR can improve transmission performance by enabling a higher average transmission power without distorting the waveform when its peaks exceed a saturation point of a power amplifier.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a process for a wireless communication device to determine a set of tones for use as peak reduction tones (PRTs) in a tone reservation (TR) algorithm for a peak-to-average power ratio (PAPR) reduction technique. Various aspects provide for tone selection for PRTs based on a deterministic pseudo-random tone selection algorithm, such as quadratic sampling, cubic sampling, or Fibonacci-type sampling.

In one example a method of wireless communication is disclosed. The method includes receiving a resource allocation spanning a set of N tones. The method further includes transmitting a data waveform multiplexed with a peak-to-average-power (PAPR) reduction waveform. The PAPR reduction waveform occupies a subset of the N tones, pseudo-randomly arranged within the resource allocation, and the data waveform occupies another subset of the N tones.

In another example an apparatus for wireless communication is disclosed. The apparatus includes means for receiving a resource allocation spanning a set of N tones. The apparatus further includes means for transmitting a data waveform multiplexed with a peak-to-average-power (PAPR) reduction waveform. The PAPR reduction waveform occupies a subset of the N tones, pseudo-randomly arranged within the resource allocation, and the data waveform occupies another subset of the N tones.

In another example a non-transitory computer-readable medium storing computer-executable code is disclosed. The code causes a wireless communication apparatus to receive a resource allocation spanning a set of N tones. The code further causes the wireless communication apparatus to transmit a data waveform multiplexed with a peak-to-average-power (PAPR) reduction waveform. The PAPR reduction waveform occupies a subset of the N tones, pseudo-randomly arranged within the resource allocation, and the data waveform occupies another subset of the N tones.

In another example an apparatus for wireless communication is disclosed. The apparatus includes a processor, a transceiver communicatively coupled to the processor, and a memory communicatively coupled to the processor. The processor and the memory are configured to receive, via the transceiver, a resource allocation spanning a set of N tones. The processor and the memory are also configured to transmit, via the transceiver, a data waveform multiplexed with a peak-to-average-power (PAPR) reduction waveform. The PAPR reduction waveform occupies a subset of the N tones, pseudo-randomly arranged within the resource allocation, and the data waveform occupies another subset of the N tones.

These and other aspects of the technology discussed herein will become more fully understood upon a review of the detailed description, which follows. Other aspects, features, and embodiments will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments it should be understood that such exemplary embodiments can be implemented in various devices, systems, and methods.

DETAILED DESCRIPTION

Figure 1:
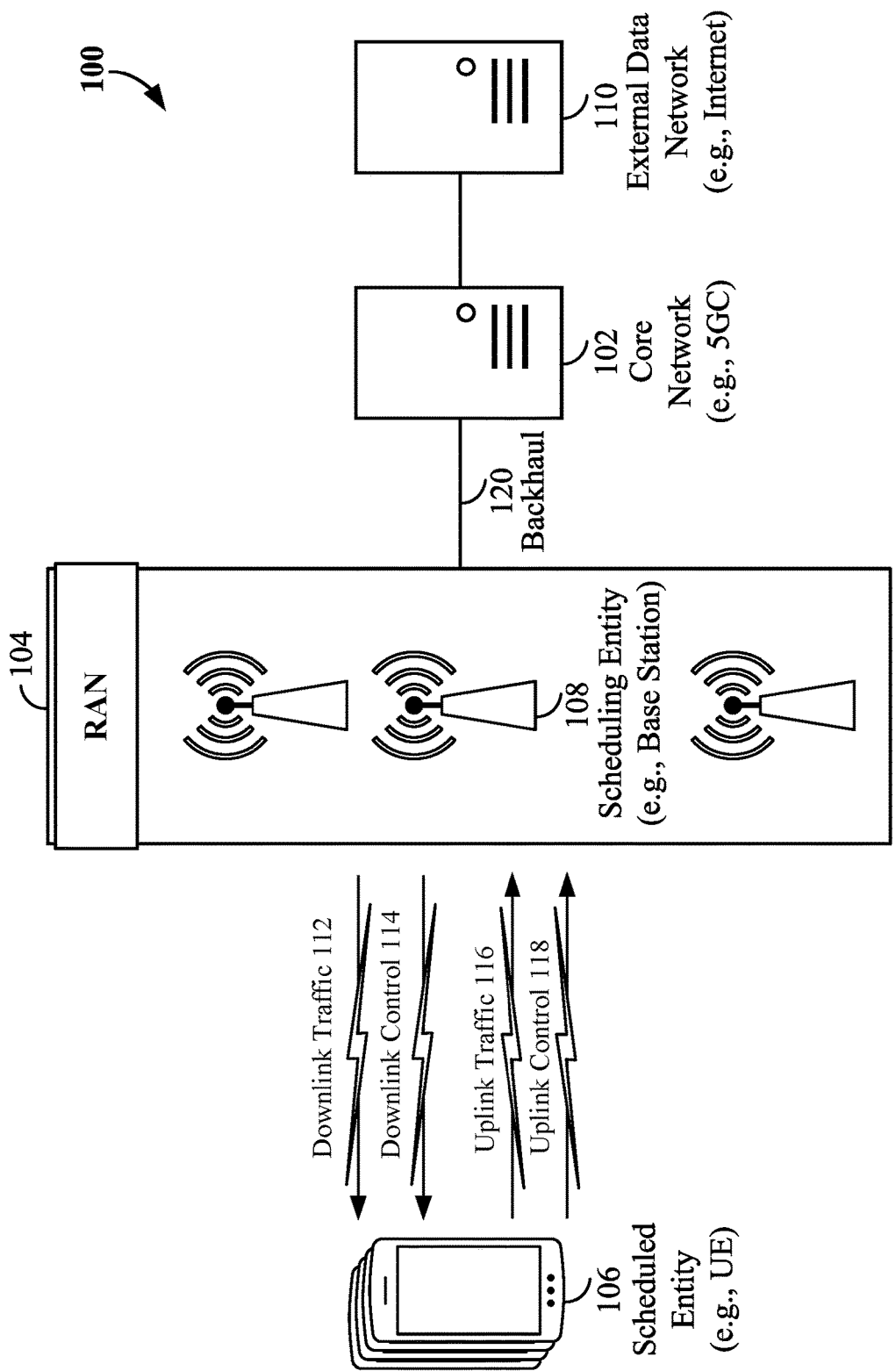
FIG. 1 is a schematic illustration of a wireless communication system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In some aspects, the present disclosure provides a process for a wireless communication device to determine a set of tones for use as peak reduction tones (PRTs) in a tone reservation (TR) algorithm for a peak-to-average power ratio (PAPR) reduction technique. Various aspects provide for tone selection for PRTs based on a deterministic pseudo-random tone selection algorithm, such as quadratic sampling, cubic sampling, or Fibonacci-type sampling. At least in some examples, the disclosed techniques allow for wireless communications, such as wireless communications including orthogonal frequency division multiplexing (OFDM) waveforms, that have reduced peak-to-average power ratio (PAPR). By reducing PAPR of transmitted waveforms, among other advantages, a wireless communication device may wirelessly communicate with a higher average transmission power and avoid waveform distortion that could otherwise be caused by the waveform's peaks exceeding a saturation point of a power amplifier.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a base station as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 supports wireless communication for multiple mobile apparatuses. Those skilled in the art may refer to a mobile apparatus as user equipment (UE) in 3GPP standards, but may also be refer to a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
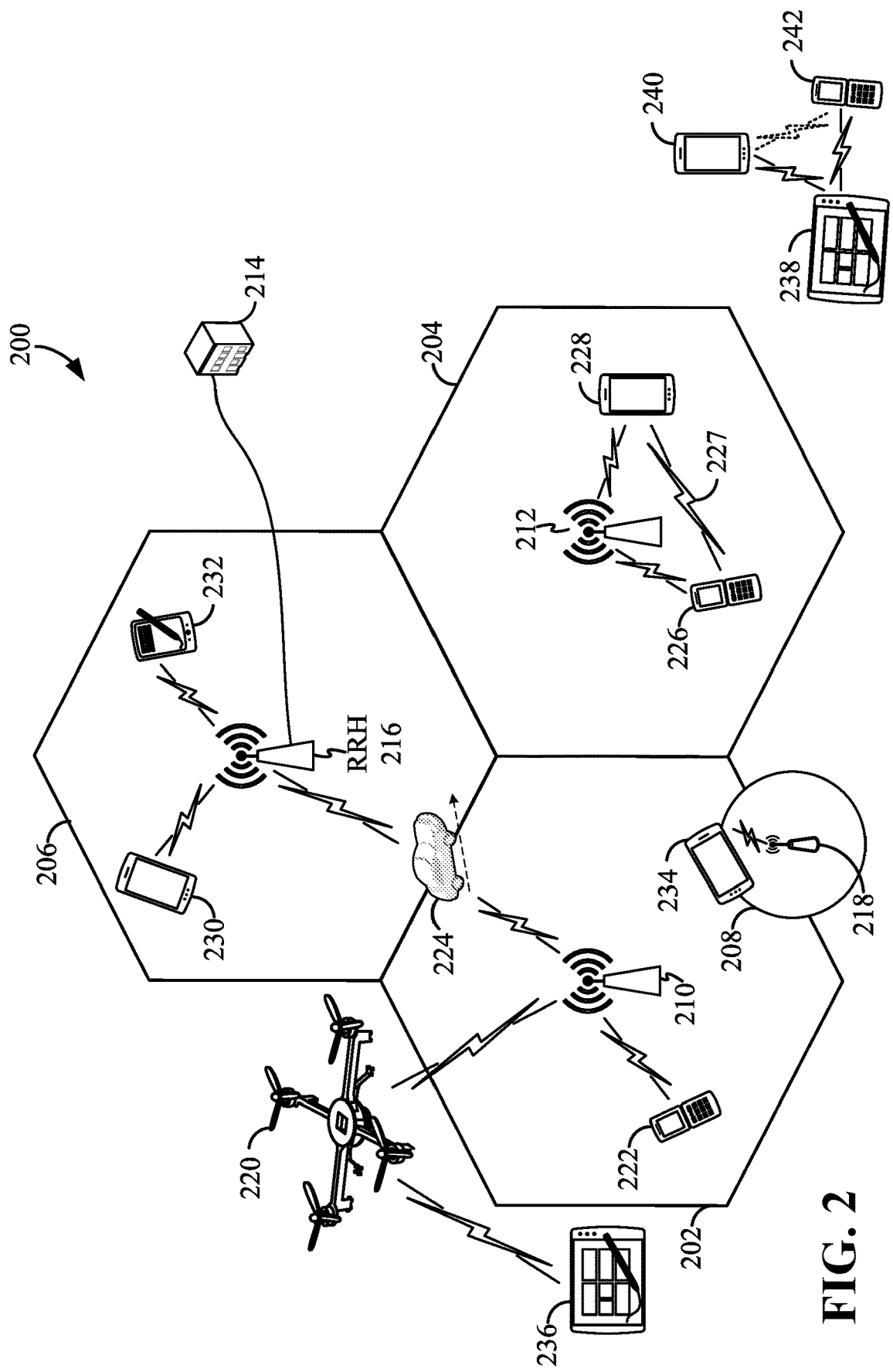
FIG. 2 is a conceptual illustration of an example of a radio access network according to some embodiments.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations and cells. Further, a RAN may include a relay node to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. An access and mobility management function (AMF), not illustrated, part of the core network 102 in FIG. 1) may generally set up, maintain, and release the various physical channels between the UE and the radio access network. The AMF may further include a security context management function (SCMF) that manages the security context for both the control plane and the user plane functionality, and a security anchor function (SEAF) that performs authentication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a base station may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
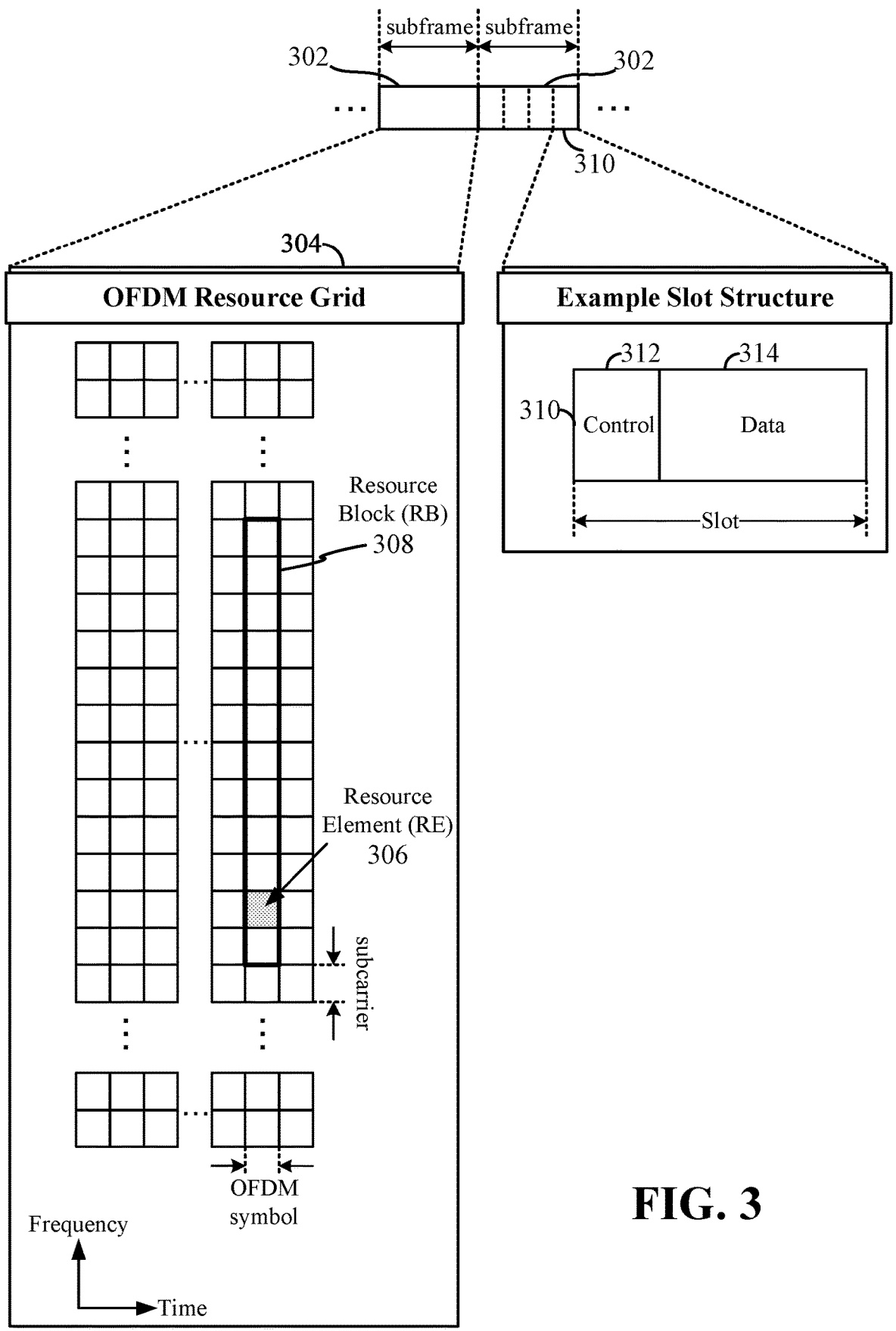
FIG. 3 is a schematic illustration of an organization of wireless resources in an air interface utilizing orthogonal frequency divisional multiplexing (OFDM) according to some embodiments.

FIG. 3 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL. FIG. 3 illustrates an expanded view of an exemplary DL subframe 302, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may schematically represent time-frequency resources for a given antenna port. That is, in a multiple input multiple output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. The present disclosure assumes, by way of example, that a single RB such as the RB 308 entirely corresponds to a single direction of communication (either transmission or reception for a given device).

A UE generally utilizes only a subset of the resource grid 304. An RB may be the smallest unit of resources that a scheduler can allocate to a UE. Thus, the more RBs scheduled for a UE, and the higher the modulation scheme chosen for the air interface, the higher the data rate for the UE.

In this illustration, the RB 308 occupies less than the entire bandwidth of the subframe 302, with some subcarriers illustrated above and below the RB 308. In a given implementation, the subframe 302 may have a bandwidth corresponding to any number of one or more RBs 308. Further, the RB 308 is shown occupying less than the entire duration of the subframe 302, although this is merely one possible example.

Each 1 ms subframe 302 may consist of one or multiple adjacent slots. In FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A base station may in some cases transmit these mini-slots occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within an RB 308 may carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

Figure 4:
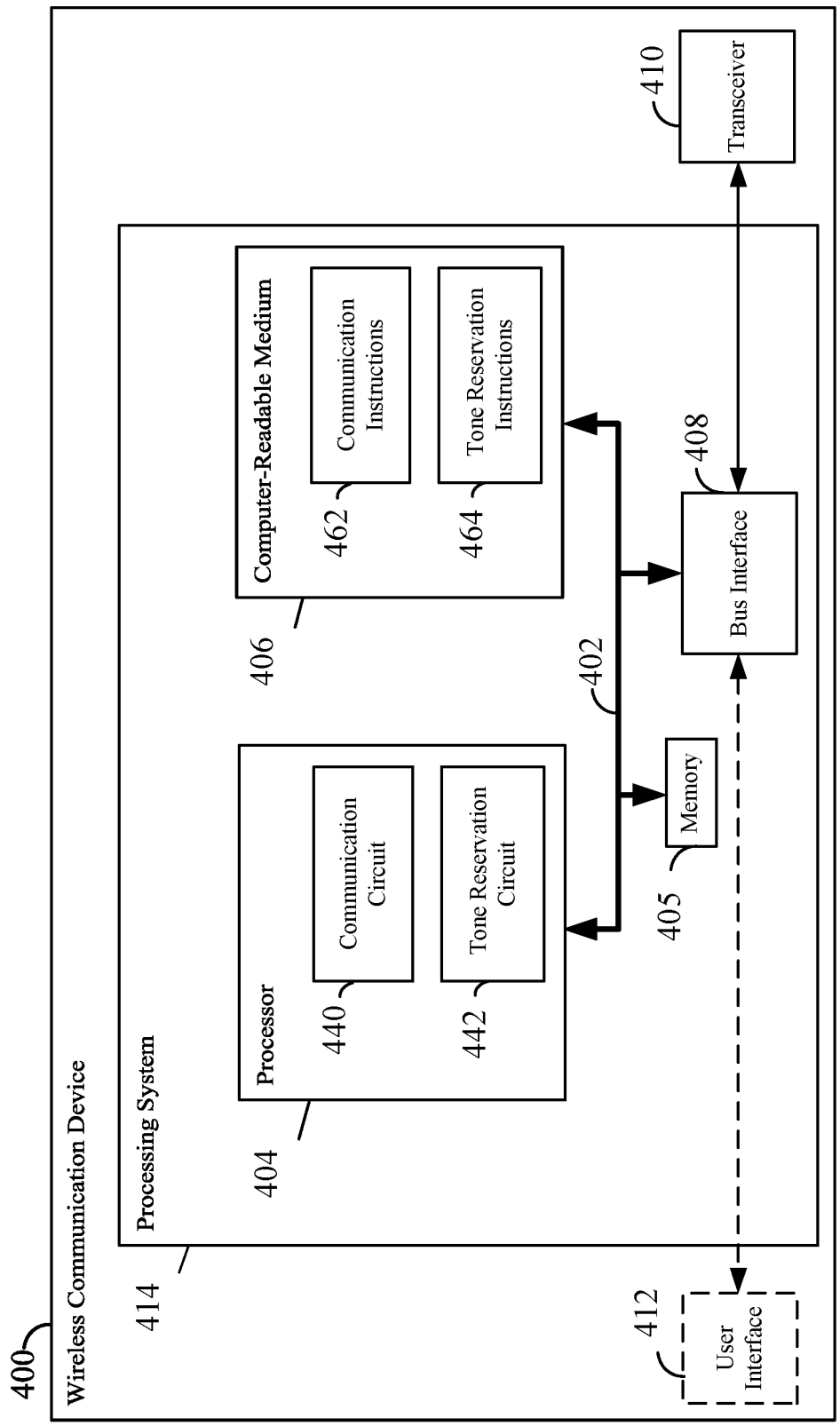
FIG. 4 is a block diagram conceptually illustrating an example of a hardware implementation for a transmission/reception entity according to some embodiments of the disclosure.

FIG. 4 is a block diagram illustrating an example of a hardware implementation for a wireless communication device 400 employing a processing system 414. For example, the wireless communication device 400 may be a gNB, NG-eNB, eNB, or any other suitable transmission and reception (TRP) device, as illustrated in any one or more of FIGS. 1 and/or 2. In further examples, the wireless communication device 400 may be a UE as illustrated in any one or more of FIG. 1 or 2. In further examples, the wireless communication device 400 may be a transceiver, an integrated chip (IC) with an integrated transceiver, or a discrete processor and transceiver, for example, within a base station or UE of any one or more of FIG. 1 or 2. In other various examples, the transmission reception entity may be any suitable wireless communication apparatus configured as described herein.

The wireless communication device 400 may include a processing system 414 having one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 400 may be configured to perform any one or more of the functions described herein. That is, the processor 404, as utilized in a wireless communication device 400, may be configured (e.g., in coordination with the memory 405) to implement any one or more of the processes and procedures described below and illustrated in FIGS. 8, 9 and/or 10.

The processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and some examples, such as a base station, may omit it.

In some aspects of the disclosure, the processor 404 may include communication circuitry 440 configured (e.g., in coordination with the memory 405) for various functions, including, e.g., transmitting or receiving a resource allocation, transmitting or receiving data waveforms including any suitable control and/or data information. For example, the communication circuitry 440 may be configured to implement one or more of the functions described below in relation to FIG. 8, including, e.g., blocks 802, 804, 806, and/or 818 and FIG. 10, including, e.g., blocks 1002 and 1004. In some aspects of the disclosure, the processor 404 may further include tone reservation circuitry 442 configured (e.g., in coordination with the memory 405) for various functions, including, e.g., determining to designate a certain number of tones as peak reduction tones (PRT), and selecting particular tones within a resource allocation to be the PRT based on a deterministic pseudo-random pattern generation algorithm. For example, the tone reservation circuitry 442 may be configured to implement one or more of the functions described below in relation to FIG. 8, including, e.g., block 808, 810, 812, and/or 814. The tone reservation circuitry 442 may further be configured to implement one or more of the functions described below in relation to FIG. 9, including, e.g., block 902, 904, and/or 906. The tone reservation circuitry 442 may further be configured to implement one or more of the functions described below in relation to FIG. 10, including, e.g., block 1004.

The processor 404 is responsible for managing the bus 402 and general processing, including the execution of software stored on the computer-readable medium 406. The software, when executed by the processor 404, causes the processing system 414 to perform the various functions described below for any particular apparatus. The processor 404 may also use the computer-readable medium 406 and the memory 405 for storing data that the processor 404 manipulates when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may store computer-executable code that includes communication instructions 462 that configure a wireless communication device 400 for various functions, including, e.g., transmitting or receiving a resource allocation, and transmitting or receiving data waveforms including any suitable control and/or data information. For example, the communication instructions 462 may be configured to cause a wireless communication device 400 to implement one or more of the functions described below in relation to FIG. 8, including, e.g., blocks 802, 804, 806, and/or 818, and in relation to FIG. 10, including, e.g., blocks 1002 and 1004. In some aspects of the disclosure, the computer-readable storage medium 406 may store computer-executable code that includes tone reservation instructions 464 that configure a wireless communication device 400 for various functions, including, e.g., determining to designate a certain number of tones as peak reduction tones (PRT), and selecting particular tones within a resource allocation to be the PRT based on a deterministic pseudo-random pattern generation algorithm. For example, the tone reservation instructions 464 may be configured to cause a wireless communication device 400 to implement one or more of the functions described below in relation to FIG. 8, including, e.g., blocks 808, 810, 812, and/or 814. The tone reservation instructions 464 may further be configured to cause a wireless communication device 400 to implement one or more of the functions described below in relation to FIG. 9, including, e.g., blocks 902, 904, and/or 906. The tone reservation instructions 464 may further be configured to cause a wireless communication device 400 to implement one or more of the functions described below in relation to FIG. 10, including, e.g., block 1004.

In one configuration, the wireless communication device 400 includes means for transmitting or receiving a resource allocation, means for transmitting or receiving data waveforms including any suitable control and/or data information, means for designating a certain number of tones as peak reduction tones (PRT), and means for selecting particular tones within a resource allocation to be the PRTs based on a deterministic pseudo-random pattern generation algorithm. In one aspect, the aforementioned means may be the processor 404 shown in FIG. 4 configured to perform the functions recited by the aforementioned means. In another aspect, the aforementioned means may be a circuit or any apparatus configured to perform the functions recited by the aforementioned means.

Figure 8:
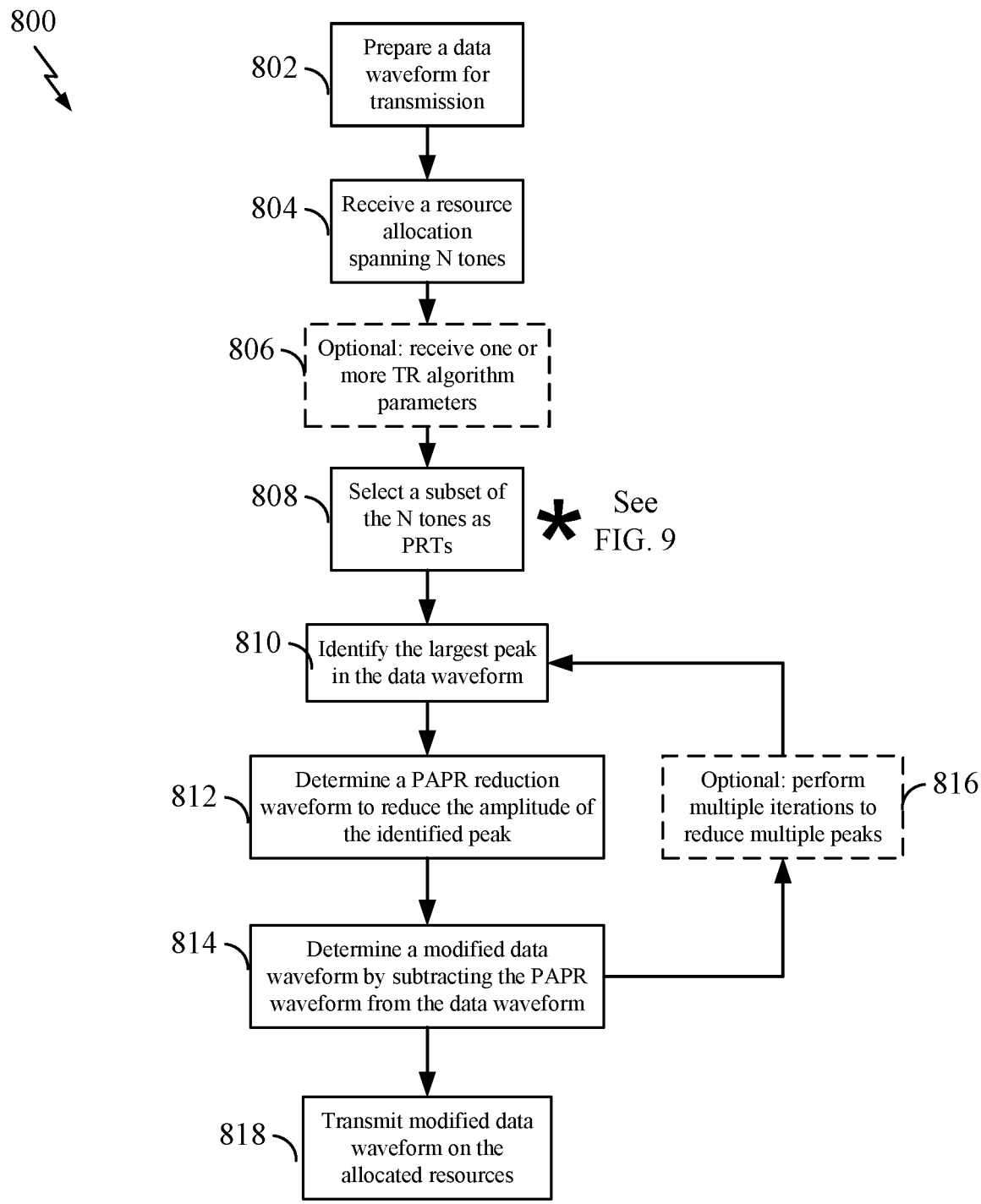
FIG. 8 is a flow chart illustrating an exemplary process for peak-to-average power ratio (PAPR) reduction based on a TR algorithm according to some embodiments of the disclosure.
Figure 9:
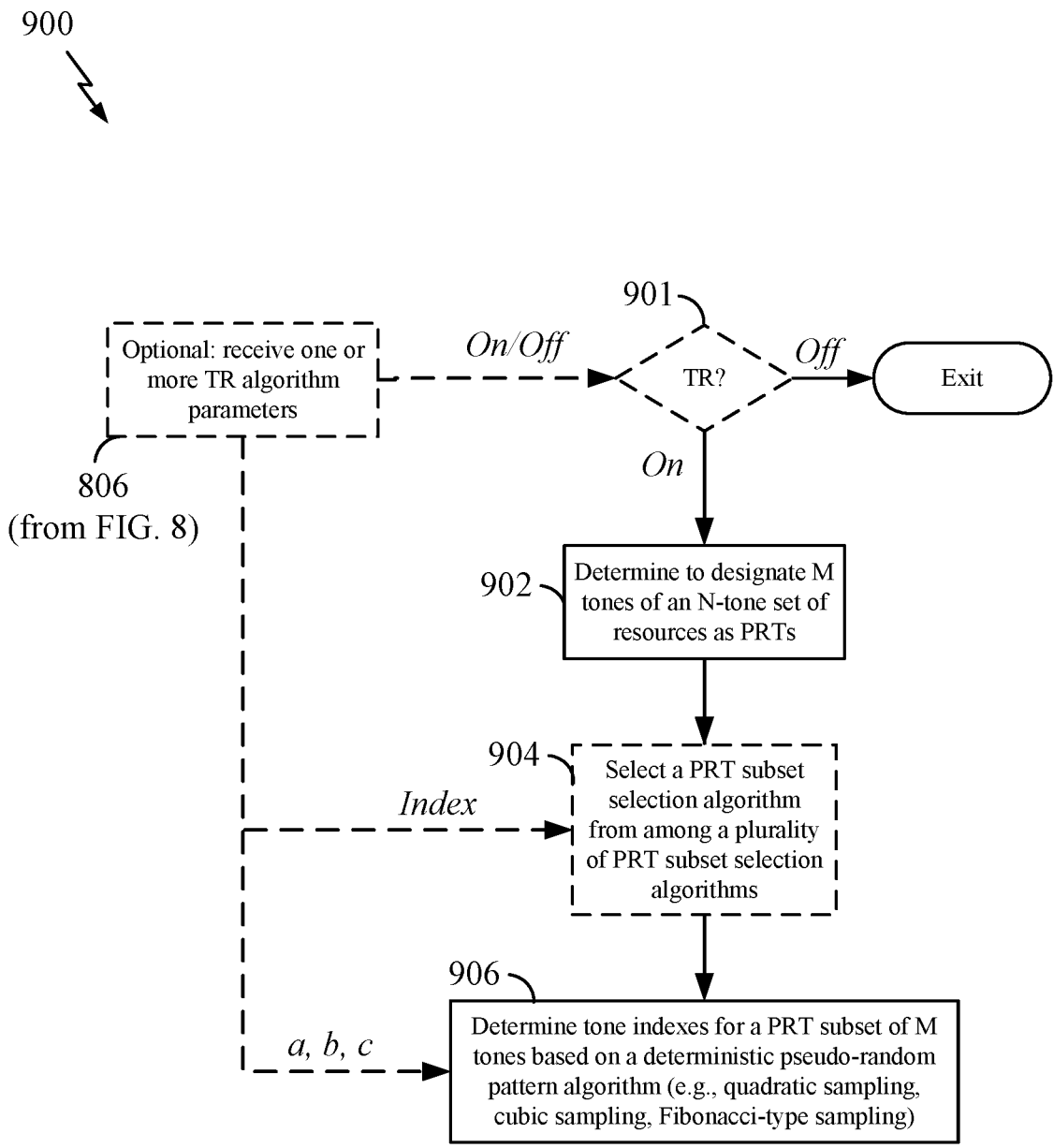
FIG. 9 is a flow chart illustrating an exemplary process for selecting a PRT pattern for a TR algorithm according to some embodiments of the disclosure.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1 and/or 2, and utilizing, for example, the processes and/or algorithms described herein in relation to FIGS. 8, 9 and/or 10.

When an apparatus such as the wireless communication device 400 undertakes to communicate over a wireless channel, a transceiver (e.g., transceiver 410) provides for wireless communication functions using one or more antennas. The transceiver 410 receives an input waveform for transmission and applies a power amplifier (PA) to the waveform. The PA drives the antenna(s) and executes a transmission. However, a PA generally has a limit to the power $P_{in}$ of an input waveform that it can amplify. And further, PA operation with a high input power, at or near this limit, may result in nonlinear behavior. In other words, at a relatively low input power, amplitude variations in the PA's input waveform provide for generally proportional variations in the power of an amplified output waveform $P_{out}$. But, at a very high input power (e.g., above the PA's saturation point $P_{sat}$), the PA's amplification factor ($P_{out}/P_{in}$) can vary as a function of $P_{in}$. For example, a PA may not be capable of amplifying an input waveform that has an input power $P_{in}$ that is well above the saturation point $P_{sat}$.

This nonlinear behavior can result in in-band and out-of-band distortion of the amplified waveform, not only corrupting the intended waveform and degrading a receiver's error vector magnitude (EVM), but also increasing interference outside the intended transmission bandwidth, or an adjacent channel leakage ratio (ACLR).

To avoid this non-linearity, a transceiver may be configured to apply input waveforms to the PA that have a mean input power $P_{\mu\_in}$ of several dB lower than the saturation point. For example, a suitable mean input power level $P_{\mu\_in}$ may be one that maintains the amplified output signal at a peak-to-average power ratio (PAPR=$P_{peak\_out}/P_{\mu\_out}$) below a certain threshold level. That is, PAPR=($P_{peak\_out}/P_{\mu\_out}$)<$P_{Threshold}$<$P_{sat}$.

However, the PAPR of the output signal depends on more than just the PA saturation point. Even if there were a perfectly linear, ideal PA, the PAPR may still be high if the intended waveform to be transmitted has high peaks in its power. For example, the waveform of an OFDM transmission is known to suffer from a significant PAPR, generally rising with increases in an OFDM block size, or the maximum number of subcarriers or tones within a component carrier. With a fixed subcarrier spacing, the number of subcarriers increases as the bandwidth grows. Because one aim of 5G NR is to provide higher data rates than 4G LTE, NR may utilize an even larger block size than LTE, further increasing the PAPR.

There exist several known techniques to effectively reduce the PAPR of an OFDM waveform. However, existing techniques are generally data-dependent and computationally expensive, making them unsuitable for an OFDM transmitter to implement in real-time. Current industry participants typically apply a clipping and filtering (CF) technique to reduce the PAPR. However, CF can result in in-band distortion of the amplified waveform, and may not provide a suitable PAPR reduction solution.

Figure 5:
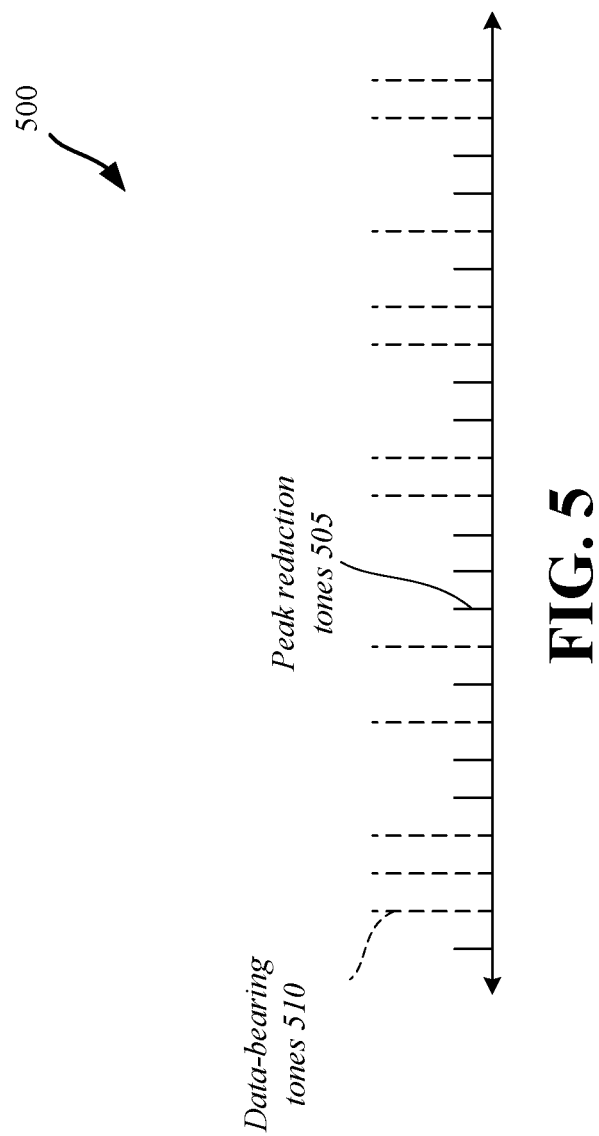
FIG. 5 is a frequency-domain illustration of one example of peak reduction tone (PRT) distribution among a set of data-bearing tones.

As the available bandwidth allocated for cellular networks continues to increase, networks that use OFDM often exploit the extra bandwidth by using longer OFDM symbols. However, this can further increase the PAPR. On the other hand, if an excess of bandwidth is available, a further PAPR reduction technique called tone reservation (TR) becomes practical. Broadly, TR means that for a given OFDM symbol, a transmitter transmits a suitable PAPR-reduction waveform on what would otherwise be idle tones. These idle tones are also equivalently called reserved tones, or peak reduction tones (PRT). The receiver may then ignore the signal on the PRTs, and only decode the tones that carry data (data-bearing tones). As a point of reference, a UE that receives a grant for 2 RBs=24 tones may reasonably select half of those tones, or 12 tones, as PRTs. FIG. 5 is a frequency-domain representation 500 of such a 2-RB resource allocation including one example of a mix of 12 PRTs 505 (illustrated as short, solid bars) and 12 data-bearing tones 510 (illustrated as long, dashed bars). In other examples, more or fewer tones may be selected as PRTs.

A TR technique provides for a wireless communication device (e.g., the wireless communication device 400) to configure the amplitude and phase of a PAPR-reduction waveform to reduce or minimize the PAPR for that OFDM symbol. To maintain a low PAPR using a TR technique, a wireless communication device may select a suitable set of PRTs, and/or adjust the amplitude/phase of the PAPR-reduction waveforms on the PRTs, for each OFDM symbol. Because the wireless communication device can put the PAPR-reduction waveforms on a set of tones (PRTs) that does not overlap with a set of data-bearing tones, the TR technique can effectively reduce the PAPR such that the PAPR has little to no effect on an EVM or ACLR.

When a wireless communication device uses a TR technique for transmitting, a receiver of its transmission should be aware of which tones are PRTs. In some examples, a wireless communication device may provide its receiver with a report indicating which tones are PRTs. But in other examples, a wireless communication device and receiver may establish a fixed or static set of tones as PRTs a priori, so such a report is unneeded. A dynamic, real-time selection of PRTs per symbol may allow a wireless communication device to optimize its performance.

In further detail, one example of a TR algorithm or technique that may be utilized in accordance with some aspects of the present disclosure is set forth below. In this example, a wireless communication device (e.g., the wireless communication device 400) that implements the exemplary TR algorithm may receive a resource allocation or grant for resources that span a set of N tones or subcarriers. The set of N granted tones may be indexed by a set of consecutive integers {0, . . . , N−1} that represent tone indexes. Denote a subset $\Phi$ of the set of granted tones as PRTs. That is, the subset $\Phi$ is an M-element set of tone indexes, where M<N. Further, all elements of the subset $\Phi$ are within the set {0, . . . , N−1}. The wireless communication device may allocate the remaining tones outside the subset $\Phi$ as data-bearing tones.

This disclosure provides a process for selecting suitable tones to be PRTs in a later section. In the discussion that immediately follows, it can be assumed that a wireless communication device has identified a suitable set of tones to be PRTs to be used for transmitting.

Based on the tone subset $\Phi$, a frequency-domain kernel $P=\{P_1, \ldots, P_N\}$ may be constructed where the elements of P correspond to the tone indexes of the tones the wireless communication device selects as PRTs. That is, if $P_n$ represents the PRT at tone index n, then $$P_n = \begin{cases} 1 & \text{if } n \in \Phi \\ 0 & \text{otherwise} \end{cases}.$$

A time-domain kernel waveform p corresponding to the frequency-domain kernel P may be defined as p=IFFT(P). One feature of a time-domain kernel waveform constructed in this manner is that, if the wireless communication device selects a sufficiently large number of tones as PRTs and chooses suitable locations for these PRTs, the time domain waveform p begins to resemble a delta function with negligible side-lobes (e.g., a single, sharp peak). And further, because P is defined such that all nonzero values are real numbers (i.e., a value of 1), the phase of P is zero and the peak value of P is located at time 0. Thus, whatever the exact waveform p may take, denote the peak amplitude of the time-domain kernel waveform p as p(0).

By defining p as IFFT(P), a circular shift of p in the time domain does not affect the location of the PRTs in the frequency domain kernel P (i.e., does not affect the subset of tones included in the subset $\Phi$). However, such a circular shift of p does affect the phase of the PRTs.

As discussed above, the remaining tones of the granted resources that the wireless communication device does not select as PRTs are available to carry data. Denote $X=\{X_1, \ldots, X_N\}$ as the frequency-domain data, where $X_n$ represents the data-bearing tone at index n. That is, X is an N-element set of complex values corresponding to a data transmission in a given OFDM symbol. Here, because the elements of X span the full set of N granted tones, $X_n$=0 if n∈$\Phi$. That is, PRTs do not include part of the frequency-domain data, and data-bearing tones do not coincide with PRTs.

As with the kernel waveform p, denote the time-domain data waveform x as x=IFFT(X). Further, the amplitude of the time-domain data waveform x at time t may be denoted as x(t).

Figure 6:
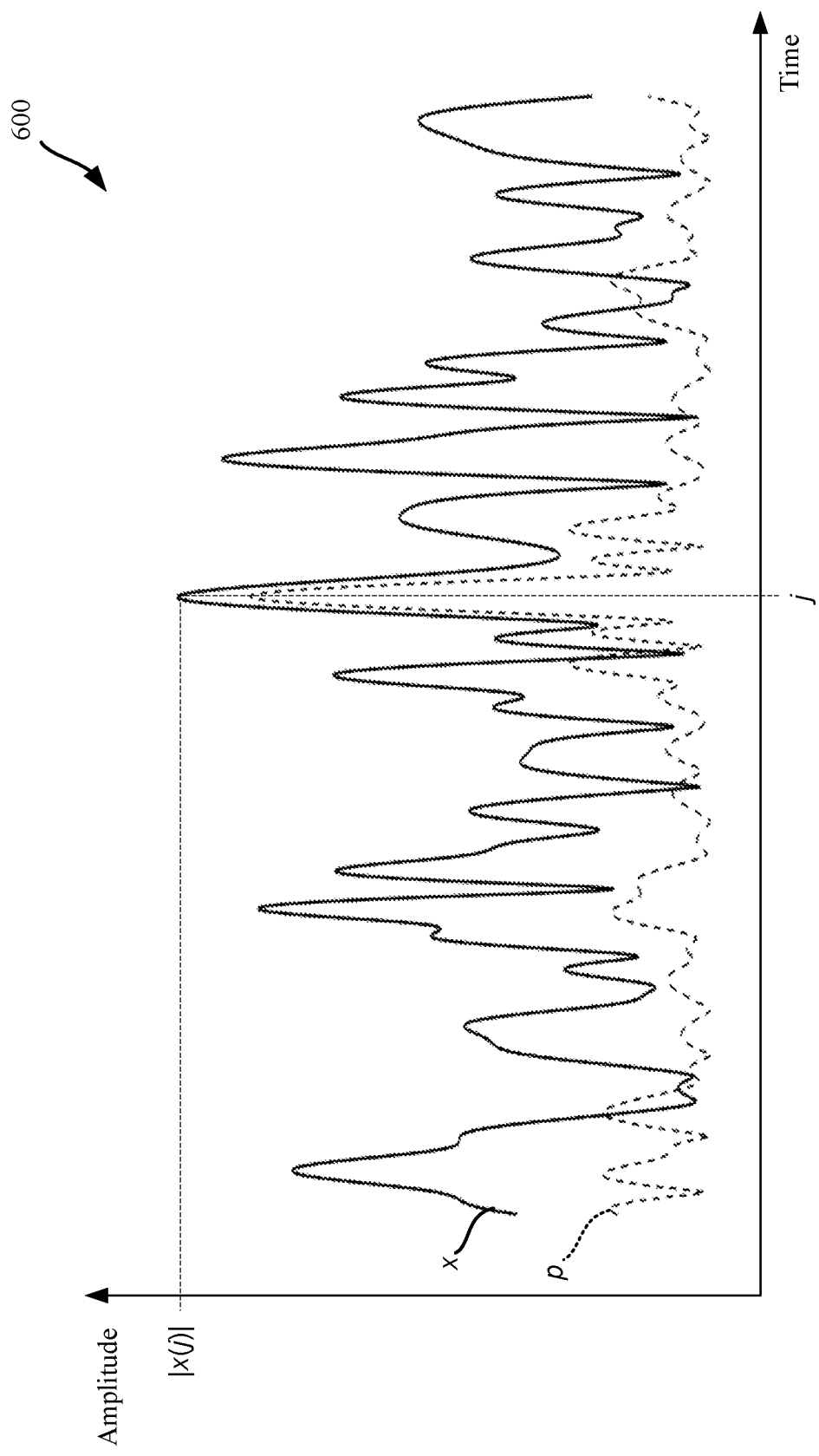
FIG. 6 is a time-domain chart illustrating a peak reduction process based on a tone reservation (TR) algorithm according to some embodiments of the disclosure.

FIG. 6 is a time-domain chart 600 illustrating a peak reduction process based on a tone reservation (TR) algorithm according to some embodiments of the disclosure. With reference to FIG. 6, an example of the time-domain data waveform x(t) and a circularly shifted version of the time-domain kernel p are illustrated.

For the purpose of the TR technique for PAPR reduction, the wireless communication device may identify the time of the largest peak in the time-domain data waveform x(t). This peak becomes the target peak for the wireless communication device to reduce to improve the PAPR. With reference to FIG. 6, the peak of this target may be denoted as x(j), where the time index of this target is at time j.

Once the wireless communication device identifies the peak in x(t), the wireless communication device circularly shifts the time-domain kernel p to align its peak with the identified peak in x, at time j, as shown in FIG. 6. Here, denote the circularly shifted version of p as $p^j$=circshift(p, j). This circular shift of the time-domain kernel p corresponds to a phase shift of the frequency-domain kernel P. Denote this phase shift applied to P to align the peak of the time-domain kernel p with the peak of the time-domain data x (identified at time j) as $\angle x(j)$. That is, $\angle x(j)$ is the phase of x(j).

With the time-domain peaks corresponding to the PRTs and the data aligned, the wireless communication device may determine a suitable scaling parameter a for scaling $p^j$, such that the wireless communication device can utilize the scaled peak of $p^j$ to reduce the peak at x(j) (shown as |x(j)|) to a suitable reduced peak value μ. That is, the wireless communication device may determine a suitable value for scaling factor a such that it may reduce |x(j)| to μ by subtracting a scaled and shifted time-domain kernel p from the time-domain waveform x. For example, $$a = \frac{|x(j)| - \mu}{p(0)}.$$

The wireless communication device then subtracts the scaled and shifted time-domain kernel $$\frac{|x(j)| - \mu}{p(0)} p^j e^{j \angle x(j)}$$

from the time-domain data waveform x to obtain a modified time-domain data waveform $$x_{new} = x - \frac{|x(j)| - \mu}{p(0)} p^j e^{j \angle x(j)}.$$

To further reduce the PAPR in a data waveform x that has several peaks, the wireless communication device then can run several iterations of the above algorithm to reduce several peaks in x.

As discussed above, in some examples, a wireless communication device may select a subset of tones Φ within its resource allocation as PRTs, and report an indication of its selection to a receiver. And in some examples, a set or pattern of PRT locations in the subset Φ can be static or fixed, such that the receiver knows the subset Φ a priori, and the wireless communication device need not report the subset Φ to the receiver. In any case, whether or not the wireless communication device selects the subset Φ for a given OFDM symbol in real-time, a suitable reduction in PAPR relies in part on which tones the wireless communication device uses as PRTs. In some examples described below, the set of PRT locations Φ may be pre-established, such that signaling of the selected tones between the wireless communication device and receiver is not necessary. However, it is to be understood that the tone selection algorithms described in the present disclosure may be utilized with or without signaling of the subset Φ.

Some tone subsets Φ produce a time-domain kernel p that exhibits characteristics more suitable for PAPR reduction than other tone subsets. For example, an ideal subset Φ for use with the signal-to-clipping noise ratio (SCR)-TR algorithm described above would provide for a time-domain kernel p having a waveform with a relatively sharp and narrow peak, and a negligible amplitude at all other times. With this ideal subset Φ, an iteration of the SCR-TR algorithm can precisely target for reduction a data waveform's peak, without affecting other portions of the data waveform. However, such an ideal subset Φ may not be achievable in implementation. For example, a narrowband resource allocation may lack a sufficient number of tones to provide such an ideal set of PRTs. Further, a subset Φ that includes a high number of tones can reduce a link's throughput by reducing the resources available to carry data-bearing symbols.

Figure 7:
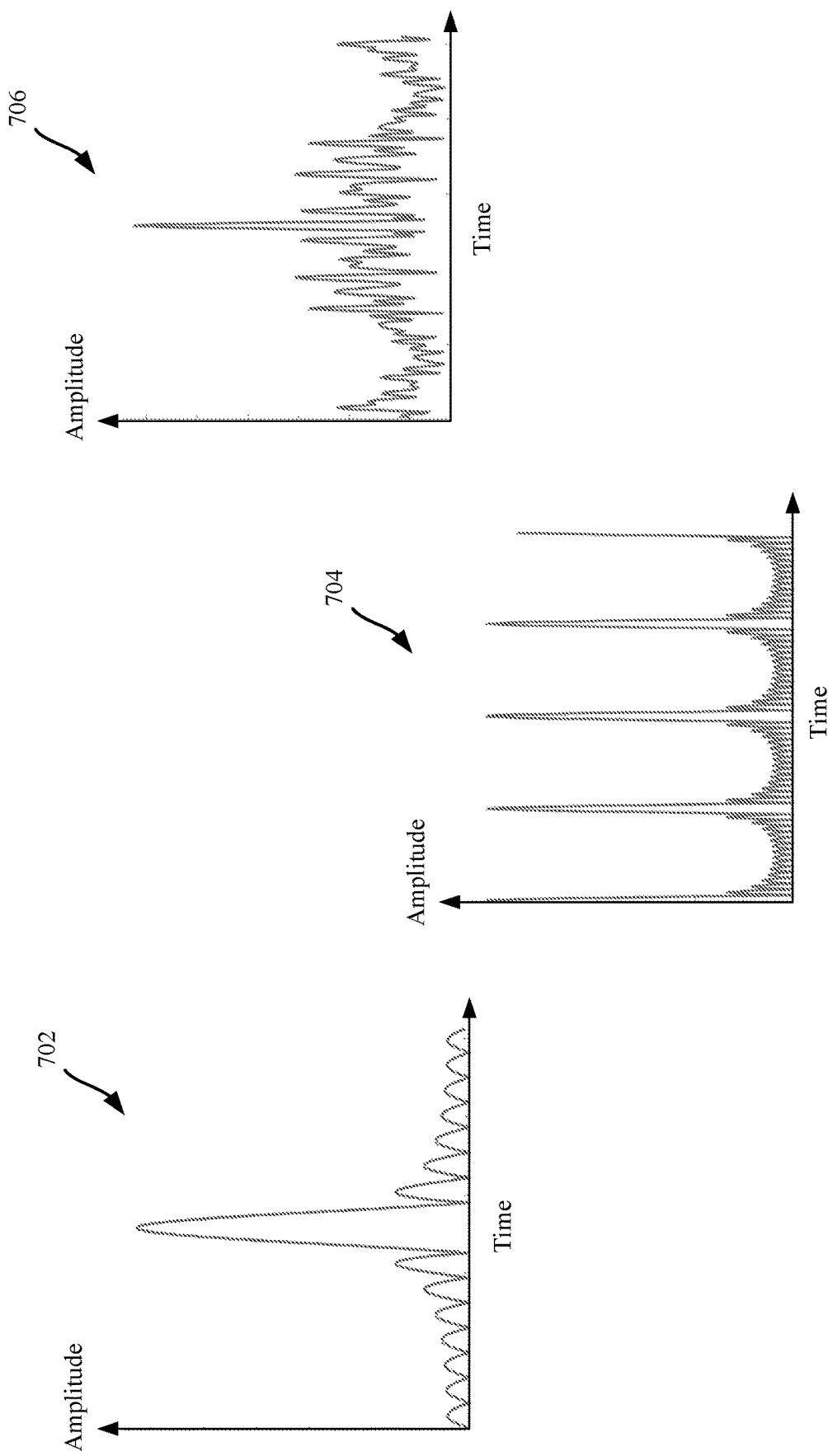
FIG. 7 is a set of three time-domain charts showing waveform characteristics corresponding to different frequency-domain PRT distributions according to some embodiments of the disclosure.

FIG. 7 provides an amplitude vs. time chart for three examples of time-domain waveforms that result from some different PRT patterns in a given resource allocation. Here, a first waveform 702 results from a contiguous set of PRTs (i.e., the tones the wireless communication device uses as PRTs are all contiguous to one another). A second waveform 704 results from a uniform comb distribution of PRTs, and a third waveform 706 is a typical waveform resulting from a randomly (or pseudo-randomly) selected set of PRTs.

Although the first waveform 702, corresponding to a contiguous set of PRTs, has a single, high peak, the width of this peak in the time-domain is dependent on the number of tones selected as PRTs. In an example where fewer tones are available for PRTs, the width of the lobe can become too wide for effective use for peak reduction. That is, while a time-domain kernel having this waveform could enable a wireless communication device to reduce a signal's peak power very well, it may undesirably affect other portions of the signal very close to the peak. The second waveform 704, corresponding to a uniform comb distribution of PRTs, provides for a sharp, narrow peak, and it also provides very large side lobes. If the second waveform 704 were used for peak reduction, these side lobes may substantially distort the data waveform.

The third waveform 706 is shown having characteristics somewhat between the first and second waveforms 702 and 704. That is, the third waveform 706 exhibits a main lobe with a relatively sharp and high peak, with comparatively low and somewhat randomized side lobes. A time-domain waveform corresponding to a randomly (or pseudo-randomly) selected set of tones as PRTs typically exhibits similar characteristics. According to an aspect of the present disclosure, a randomly (or pseudo-randomly) selected set of tones as PRTs can provide for a time-domain kernel that achieves a reasonable trade-off between the width of the main lobe and the height of the side lobes. And in an example where a wireless communication device does not (or need not) report its PRT selection to its receiver, if a selected set of tones is not fixed, then a suitable tone selection algorithm should be deterministic such that the receiver can determine the set of PRTs that the wireless communication device uses as PRTs without being explicitly signaled information to indicate the selection. Therefore, various aspects of the present disclosure provide for selection of a set of PRTs based on a deterministic pseudo-random tone selection algorithm, such as quadratic sampling, cubic sampling, Fibonacci-type sampling, etc.

Using the same nomenclature as above, assume that a transmitting device has a resource allocation or grant that spans N tones. That is, the full set of N tones in a resource allocation are denoted $\{0, \ldots, N-1\}$. Further, suppose that a subset of those tones $\Phi$, including M tones, is to include selected PRTs within the interval $\{0, \ldots, N-1\}$. As above, N>M, and all elements of $\Phi$ are within the set $\{0, \ldots, N-1\}$. That is, the PRT subset $\Phi = \{\Phi_1, \ldots, \Phi_M\}$.

According to an aspect of the present disclosure, an apparatus (e.g., a wireless communication device employing a TR algorithm in its transmission, and/or a receiver receiving the transmission) may determine a suitable subset of allocated tones to act as PRTs in a transmission. In some examples, the apparatus may determine a PRT subset as described herein for each OFDM symbol. In other examples, the apparatus may determine a PRT subset for a plurality of OFDM symbols. That is, in an aspect of this disclosure, a PRT subset may vary (e.g., per OFDM symbol, per slot, per subframe, per frame, or at any suitable time) in a deterministic way. Accordingly, in a further aspect, a wireless communication device is not required to report or transmit information indicating its selected PRT subset to a receiver.

For example, an apparatus may determine a value $\Phi_m$ for each of m elements in the PRT subset $\{\Phi_1, \ldots, \Phi_M\}$. Here, as above, each value of $\Phi_m$ represents a tone index within a given resource allocation, and identifies which tones are PRTs. The apparatus determines values of $\Phi_m$, for each integer value of m from m=0 to m=(M−1).

In various aspects, an apparatus may determine the values of $\Phi_m$ utilizing a quadratic sampling procedure, a cubic sampling procedure a Fibonacci-type sampling procedure, or any other suitable deterministic pseudo-random pattern generation algorithm to select PRT indexes. A deterministic pseudo-random pattern generation algorithm to select PRT indexes may be an algorithm that takes one or more seed values as input and provides a seemingly random number between 0 and N as an output. However, because the algorithm is deterministic, the algorithm will provide the same number as an output when the same seed value(s) are used as input. Thus, if two devices have the same seed values and use the same deterministic pseudo-random pattern generation algorithm, the two devices will arrive with the same output values. For example, each of the deterministic pseudo-random pattern generation algorithms provided below includes both (i) at least one arithmetic operation on one or more seed values, and (ii) a modulo operator to ensure that the output is between 0 and N. The at least one arithmetic operation and modulo operator provide the deterministic and the seemingly random characteristics of the output provided by the deterministic pseudo-random pattern generation algorithm.

In the equations provided below, "mod" is a modulo operator that returns the remainder of the first operand divided by the second operand. For instance, 5 mod 3=2, and 95 mod 3=2.

Quadratic Sampling $$\Phi_m = \left(a \cdot \frac{m(m+b)}{2} + c\right) \bmod N \qquad \text{Equation 1}$$

where a and b may be any positive odd integer, e.g., 1, 3, 5, ...; and c may be any non-negative integer. Calculate $\Phi_m$ for each value of m from m=0 to m=(M−1). Here, the variable m is squared and, accordingly, the function is quadratic.

Cubic Sampling $$\Phi_m = \left(a \cdot \frac{m(m+1)(2m+1)}{2} + b\right) \bmod N \qquad \text{Equation 2}$$

where a may be any positive odd integer, e.g., 1, 3, 5, ...; and b may be any non-negative integer. Calculate $\Phi_m$ for each value of m from m=0 to m=(M−1). Here, the variable m is cubed and, accordingly, the function is cubic.

Fibonacci-Type Sampling $$\Phi_m = (\Phi_{m-1} + \Phi_{m-2}) \bmod N \qquad \text{Equation 3}$$

where $\Phi_0$ and $\Phi_1$ may be any non-negative integers such that $\Phi_0 + \Phi_1$ is odd. For instance, $\Phi_0 = 1$, and $\Phi_1 = 2$. Calculate $\Phi_m$ for each value of m from m=0 to m=(M−1). Equation 3 is a "Fibonacci-type" sampling because the equation uses the addition of the last two elements in the series (i.e., a sum of the two preceding elements or results, $\Phi_{m-1} + \Phi_{m-2}$) to obtain the output value for the current element ($\Phi_m$).

In some of the examples provided above (e.g., a, b, and c in Equation 1; and a and b in Equation 2), the calculation depends on one or more parameters. According to a further aspect of the present disclosure, a wireless communication device and receiver may utilize any suitable signaling to coordinate a selection of the same values for these parameters for a transmission. For example, a gNB may signal values of one or more parameters to a UE for the UE to employ in relation to an UL transmission based on a TR algorithm as described herein.

In a further aspect of this disclosure, a wireless communication device may have a capability to select from among two or more PRT subsets $\Phi$ and/or two or more PRT subset selection algorithms (e.g., among the three examples provided above), for a given transmission. For example, a wireless communication device and receiver may share an indexed table with a set of two or more PRT selection algorithms. By indexing these PRT selection algorithms in the respective tables, the wireless communication device and receiver can coordinate a selection of an algorithm from the table utilizing any suitable signaling of an index value. For example, a gNB may signal an index for a UE to use to select a correspondingly indexed PRT selection algorithm.

In a still further aspect of this disclosure, a wireless communication device may have a capability to select between utilizing a TR algorithm, and not utilizing a TR algorithm. For example, a wireless communication device and receiver may utilize any suitable signaling to coordinate whether a TR algorithm will be utilized for a given transmission. For example, a gNB may include an information element associated with an UL scheduling grant to indicate whether the UE should utilize a TR algorithm for the corresponding UL transmission.

FIG. 8 is a flow chart illustrating an exemplary process 800 for PAPR reduction for a wireless transmission in accordance with some aspects of the present disclosure. As described below, a particular implementation may omit some or all illustrated features, and may not require some illustrated features to implement all embodiments. In some examples, the wireless communication device 400 illustrated in FIG. 4 may be configured to carry out the process 800. In some examples, any suitable apparatus or means for carrying out the functions or algorithm described below may carry out the process 800.

At block 802, a wireless communication device (e.g., the wireless communication device 400) may prepare a data waveform (e.g., an input waveform for a PA) for wireless transmission. The input waveform may be, but need not be an OFDM waveform. The input waveform may include any suitable data or format for transmission. For example, the input waveform may be obtained by the processor 404 from the memory 405 or the user interface 412 via the bus 402.

At block 804, the wireless communication device may receive a resource allocation for data transmission. Here, the resource allocation may span any suitable number of tones, e.g., N tones. For example, a resource allocation of N tones may be received by the wireless communication device 400 in a communication from a base station 108 (e.g., or another scheduling entity) via the transceiver 410.

At block 806, the wireless communication device may optionally receive one or more tone reservation (TR) algorithm parameters for the wireless communication device to use in connection with a PAPR reduction algorithm. The one or more TR algorithm parameters may be received by the wireless communication device from a base station via a transceiver (e.g., via the transceiver 410). These parameters may include, e.g., the integer values a, b, and/or c described above in relation to Equations 1-3. These parameters may further include, e.g., an indication, such as an index, for the wireless communication device to use to select from among two or more TR algorithms stored in memory. These parameters may further include, e.g., an indication of (i) whether the wireless communication device should or should not perform (e.g., must perform or is prohibited from performing) a TR algorithm (e.g., an On/Off TR algorithm parameter) and/or (ii) a PAPR reduction algorithm to use for a corresponding transmission. In the event that the parameter indicates for the wireless communication device not to perform the IR/PAPR algorithm, the process may end, and the wireless communication device may transmit the data waveform without utilizing the TR/PAPR algorithm in the following blocks. As noted, block 806 is optional and, in some examples, such as certain instances in which the wireless communication device is configured to use Equation 3 above, the wireless communication device does not receive one or more TR algorithm parameters (e.g., from a gNB) in block 806 and, instead, proceeds to block 808.

At block 808, the wireless communication device may select a subset of the N tones of the resource allocation to be PRTs. In FIG. 8, block 808 has a star to indicate that further details of this block are provided in FIG. 9 and the description accompanying FIG. 9 below.

At block 810, the wireless communication device may identify the largest peak in the data waveform. For example, the processor 404 may perform a peak detection algorithm on the data waveform to identify the largest peak. The peak detection algorithm may include the processor 404 iteratively comparing data points of the data waveform until all data points are considered to identify the largest of the data points, as well as other peak detection algorithms.

At block 812, the wireless communication device may determine a PAPR reduction waveform, corresponding to the selected PRTs, to reduce the amplitude of the identified peak. For example, as described above, the processor 404 may generate a frequency domain kernel P for the N allocated tones (e.g., where $P_n$ represents the PRT at tone index n, and $$P_n = \begin{cases} 1 & \text{if } n \in \Phi \\ 0 & \text{otherwise} \end{cases},$$

and then define a time-domain kernel waveform p, where p=IFFT(P). As also described above, the processor 404 may then cyclically shift the time-domain kernel waveform p to align the peak of the time-domain kernel waveform p with the largest peak in the data waveform identified in block 810. The processor 404 may then assign the aligned, circularly shifted version of p ($p^j$) as the PAPR reduction waveform.

At block 814, the wireless communication device may determine a modified data waveform by subtracting the PAPR waveform from the data waveform. For example, the processor 404 may perform the subtraction (e.g., the modified data waveform=x(t)−($p^j$)). In some examples, before the subtraction, the processor 404 may scale the PAPR waveform before by a scaling factor $$a = \frac{|x(j)| - \mu}{p(0)}.$$

Then, the processor 404 subtracts the scaled and shifted time-domain kernel $$\frac{|x(j)| - \mu}{p(0)} p^j e^{j \angle x(j)}$$

from the time-domain data waveform x to obtain the modified time-domain data waveform $$x_{new} = x - \frac{|x(j)| - \mu}{p(0)} p^j e^{j \angle x(j)}.$$

As discussed above, in some examples, a wireless communication device may optionally, at block 816, return to block 810 and perform multiple iterations of the algorithm of blocks 810-814 to reduce multiple peaks in the data waveform. Once the wireless communication device has suitably modified the data waveform, at block 818, the wireless communication device may transmit the modified data waveform on the allocated resources. For example, the processor 404 may provide the modified data waveform to the transceiver 410, which applies a power amplifier (PA) to the waveform and drives the antenna(s) of the wireless communication device 400 to transmit the modified data waveform on the N allocated tones.

FIG. 9 is a flow chart illustrating an exemplary process 900 for tone reservation (TR) for PAPR reduction for a wireless transmission in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the wireless communication device 400 illustrated in FIG. 4. In some examples, the process 900 may be carried out by any suitable apparatus or means for carrying out the functions or algorithm described below.

In some examples, FIG. 9 may correspond to block 808 from FIG. 8, for selecting a subset of tones as PRTs. And in some examples, as described above, the process 800 in FIG. 8 may optionally include block 806, where the wireless communication device (e.g., the wireless communication device 400) receives one or more TR algorithm parameters. Referring to FIG. 9, at least a portion of these parameters, if received, may feed into the process 900 as described herein. For example, if the wireless communication device receives an On/Off TR algorithm parameter, in optional decision block 901, the wireless communication device may evaluate the On/Off TR algorithm. When the On/Off TR algorithm parameter indicates not to perform the TR/PAPR reduction algorithm (e.g., the parameter indicates "Off"), then the process may end, as described above. Otherwise (e.g., when the parameter indicates "On"), at block 902, the wireless communication device may determine how many tones (e.g., M tones) to employ as PRTs. The selection of the value of M may be made based on any suitable parameters, or in other examples may be fixed or static. For example, the value of M may be a predetermined fraction of N; may depend on an amount of data ready to transmit on data-bearing tones; may be signaled to the wireless communication device by the receiving entity, etc.

At optional block 904, if the wireless communication device is capable of selecting from among a plurality of TR algorithms, then the wireless communication device may select a TR algorithm from the available algorithms. Here, if at block 806 the wireless communication device receives a TR algorithm parameter for selecting among those TR algorithms (e.g., a TR algorithm index), the wireless communication device may base its TR algorithm selection on the received parameter or index.

At block 906, the wireless communication device may determine tone indexes for a PRT subset of M tones based on a deterministic pseudo-random pattern generation algorithm. For example, as described further above, the wireless communication device may utilize a quadratic sampling pattern generation algorithm, a cubic sampling pattern generation algorithm, a Fibonacci-type sampling pattern generation algorithm, etc. In some examples, as described above, the pattern that the pattern generation algorithm creates may depend on one or more parameters. If, at block 806 the wireless communication device receives corresponding TR algorithm parameters (e.g., {a, b, c} for a quadratic sampling algorithm based on Equation 1 above; or {a, b} for a cubic sampling algorithm based on Equation 2 above, etc.), the wireless communication device may apply the received parameters to the pattern generation algorithm. The determined tone indexes for a PRT subset of M tones may then be used as the subset of N tones selected as PRTs in block 808 of FIG. 8.

Figure 10:
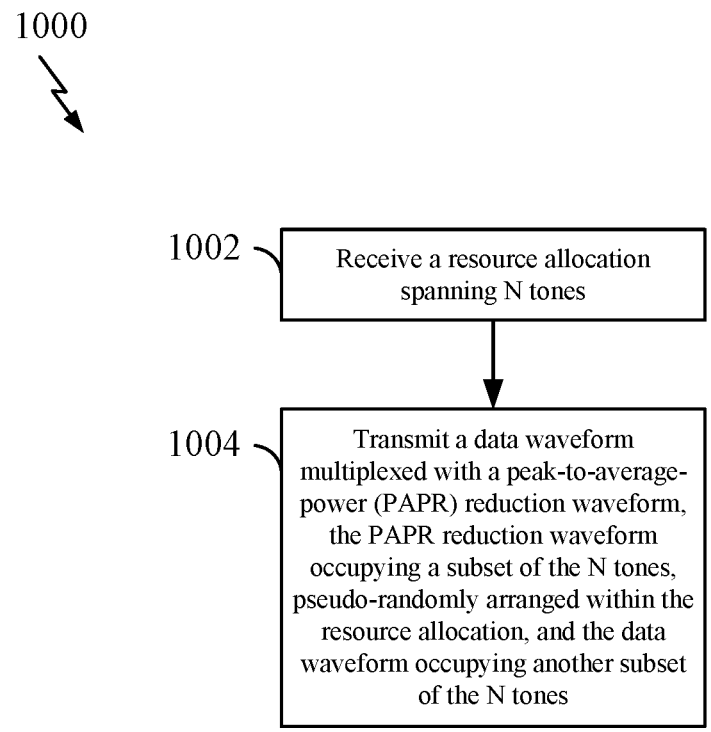
FIG. 10 is a flow chart illustrating another exemplary process for peak-to-average power ratio (PAPR) reduction based on a TR algorithm according to some embodiments of the disclosure.

FIG. 10 is a flow chart illustrating an exemplary process 1000 for PAPR reduction for a wireless transmission in accordance with some aspects of the present disclosure. As described below, a particular implementation may omit some or all illustrated features, and may not require some illustrated features to implement all embodiments. In some examples, the wireless communication device 400 illustrated in FIG. 4 may be configured to carry out the process 1000. In some examples, any suitable apparatus or means for carrying out the functions or algorithm described below may carry out the process 1000.

At block 1002, a wireless communication device (e.g., the wireless communication device 400) may receive a resource allocation spanning a set of N tones. The resource allocation may span any suitable number of tones, e.g., N tones. For example, the wireless communication device 400 may receive a resource allocation of N tones in a communication from a base station 108 (e.g., or another scheduling entity) via the transceiver 410.

At block 1004 the wireless communication device may transmit a data waveform multiplexed with a peak-to-average-power (PAPR) reduction waveform, the PAPR reduction waveform occupying a subset of the N tones, pseudo-randomly arranged within the resource allocation, and the data waveform occupying another subset of the N tones. In some examples, the pseudo-random arrangement of the subset of the N tones within the resource allocation may be based on a deterministic pseudo-random pattern generation algorithm, as described further below. Further, in some examples, the PAPR reduction waveform may be based on the data waveform, as described further below.

To transmit the data waveform multiplexed with the PAPR reduction waveform, the wireless communication device 400 may determine a modified data waveform by subtracting the PAPR waveform from the data waveform. The modified data waveform is an example of the data waveform multiplexed with the PAPR reduction waveform. The wireless communication device 400 may perform the subtraction (e.g., the modified data waveform=x(t)−(p$^j$)). In some examples, before the subtraction, the wireless communication device 400 may scale the PAPR waveform by a scaling factor $$a = \frac{|x(j)| - \mu}{p(0)}.$$

Then, the wireless communication device 400 subtracts the scaled and shifted time-domain kernel $$\frac{|x(j)| - \mu}{p(0)} p^j e^{j \angle x(j)}$$

from the time-domain data waveform x to obtain the modified time-domain data waveform $$x_{new} = x - \frac{|x(j)| - \mu}{p(0)} p^j e^{j \angle x(j)}.$$

Then, to transmit the data multiplexed with the PAPR reduction waveform on resources corresponding to the resource allocation, the wireless communication device 400 may provide the modified data waveform to the transceiver 410, which applies a power amplifier (PA) to the waveform and drives the antenna(s) of the wireless communication device 400 to transmit the modified data waveform on the N allocated tones. In transmitting the modified data waveform on the N allocated tones, the PAPR reduction waveform may occupy the subset of the N tones (PRTs) that are pseudo-randomly arranged within the resource allocation of N tones, and the data waveform may occupy another subset of the N tones (e.g., the remaining tones of the N tones that are not PRTs).

In some examples, to multiplex the data waveform with the PAPR reduction waveform, the wireless communication device 400 may subtract the PAPR reduction waveform from the data waveform without scaling, simplifying the multiplexing operation. In some examples, to multiplex the data waveform with the PAPR reduction waveform, the wireless communication device 400 may first scale the PAPR reduction waveform, and then subtract the PAPR reduction waveform from the data waveform. By scaling the PAPR reduction waveform first, the PAPR reduction waveform can be sized to prevent the wireless communication device 400 from reducing the peaks of the data waveform too much or too little when subtracting the PAPR reduction waveform from the data waveform.

In some examples, after generating a modified data waveform (e.g., by scaling and/or subtracting the PAPR reduction waveform from the data waveform), but before transmission, the wireless communication device (e.g., the wireless communication device 400) may repeat the scaling and/or subtracting using the modified data waveform to determine a further peak-to-average-power (PAPR) reduction waveform for transmission on the PRTs. For example, the wireless communication device may determine this further PAPR reduction waveform based on the modified data waveform using a similar process as described below including identifying a peak in the modified data waveform and aligning respective peaks of the modified data waveform and a time-domain kernel waveform p. The processor 404 may then assign this aligned, circularly shifted version of p ($p^j$) as the further PAPR reduction waveform. The resulting further PAPR reduction waveform may then be subtracted from the modified data waveform. Thus, the further PAPR reduction waveform can be used to reduce peaks and, in turn, PAPR, in the modified data waveform. This repetition of the subtraction of further PAPR reduction waveforms may continue until a certain number of iterations are completed, until a certain time is elapsed, or until peaks in the resulting further modified data waveform are sufficiently low (e.g., below a threshold). Once the iterations are complete, the wireless communication device 400 may provide the further modified data waveform to the transceiver 410, which applies a power amplifier (PA) to the waveform and drives the antenna(s) of the wireless communication device 400 to transmit the further modified data waveform on the N allocated tones. In other words, in these examples, the wireless communication device may transmit the data waveform multiplexed with the PAPR reduction waveform, as well as one or more further PAPR reduction waveforms, on resources corresponding to the resource allocation.

As noted above, in block 1004, the pseudo-random arrangement of the subset of the N tones within the resource allocation may be based on a deterministic pseudo-random pattern generation algorithm. For example, the wireless communication device may select the subset of the N tones to be peak reduction tones (PRT) based on a deterministic pseudo-random pattern generation algorithm that resolves to a tone index, such as a quadratic sampling pattern generation algorithm that uses a squared variable, a cubic sampling pattern generation algorithm that uses a cubed variable, or a Fibonacci-type sampling pattern generation algorithm that sums two preceding elements, as described above, or another deterministic pseudo-random pattern algorithm. Each algorithm may have a different pseudorandomness measure, different complexity, and different quantity of parameter inputs, which can lead one algorithm to be more advantageous to use over another algorithm in a particular circumstance. For example, the Fibonacci-type sample pattern generation algorithm (Equation 3) can be executed without receiving additional parameters (e.g., parameters a, b, or c like in Equations 1 and 2). Additionally, one algorithm may perform better than another algorithm for a certain resource block allocation size. For example, one algorithm may perform better for a resource block allocation below a threshold (e.g., five, ten, fifteen resource blocks), and another algorithm may perform better for a resource block allocation of more than the threshold or within a certain range (e.g., between six and one hundred resource blocks, between ten and fifty resource blocks, etc.).

In some examples, the wireless communication device 400 executes the process 900 of FIG. 9 to select a subset of the N tones to be PRTs as part of block 1004. For example, the processor 404 may determine to designate M tones of an N-tone set of resources as PRTs (see block 902 of FIG. 9), and may determine tone indexes for the subset of M tones to be PRTs based on a deterministic pseudo-random pattern algorithm (see block 906 of FIG. 9). As noted, the selection of the value of M may be made based on any suitable parameters, or in other examples may be fixed or static. For example, the value of M may be a predetermined fraction of N; may depend on an amount of data ready to transmit on data-bearing tones; may be signaled to the apparatus by the receiving entity, etc. By determining to designate M tones as PRTs, the processor 404 is able to select the number of tones that serve as PRTs to accommodate a particular scenario. Additionally, determining the tone indexes for the subset of M tones to be PRTs based on a deterministic pseudo-random pattern algorithm can provide for a time-domain kernel that achieves a reasonable trade-off between the width of the main lobe and the height of the side lobes, as discussed with respect to the waveforms 702, 704, and 706 in FIG. 7.

In some examples, one or more of the optional blocks of the process 900 are executed to implement, in part, block 1004 of the process 1000. For example, the wireless communication device 400 may receive one or more TR algorithm parameters (see block 806 in FIG. 9) to provide additional control of the PAPR reduction technique and selection of the subset of the N tones as PRTs. In some instances, the wireless communication device 400 may receive a tone reservation (TR) On/Off parameter in block 806 of FIG. 9, and then, in block 901, determine whether to utilize the PAPR reduction waveform for transmission with the data waveform based on the TR On/Off parameter. For example, a base station 108 may include the TR On/Off parameter associated with a UL scheduling grant to indicate whether the wireless communication device 400 should utilize the PAPR reduction waveform for the corresponding UL transmission. The TR On/Off parameter may be received by the wireless communication device 400 via the transceiver 410. Thus, a base station 108 is operable to control whether the wireless communication device 400 performs the PAPR reduction technique. For example, the base station may enable PAPR reduction technique when desirable (e.g., when PAPR is at or expected to be at an elevated level) and disable the PAPR reduction technique when not desirable (e.g., when PAPR is not at or not expected to not be at an elevated level).

As another example, the wireless communication device 400 may receive a PRT determination algorithm selection parameter in block 806 of FIG. 9, and then, in block 904, select the pseudo-random pattern generation algorithm from among a plurality of pseudo-random pattern generation algorithms based on the PRT determination algorithm selection parameter. The PRT determination algorithm selection parameter may be received via the transceiver 410, for example, from a base station 108. Thus, a base station is operable to control whether the wireless communication device 400 performs the PAPR reduction technique. For example, the base station may select the particular algorithm expected to achieve an effective PAPR reduction, or that has achieved an effective PAPR reduction in recent communications. As another example, the base station may select the particular algorithm based on the size of the resource block allocation. The base station may select based on the size of the resource block allocation because the performance of the algorithms may vary based on the size of the resource block allocation. For example, the base station may select a first algorithm when the resource block allocation size is below a threshold, and may select a second algorithm when the resource block allocation size is above the threshold.

As another example, the wireless communication device 400 may receive parameters in block 806 of FIG. 9 for use in a deterministic pseudo-random pattern algorithm (e.g., a, b, and c in Equation 1; and a and b in Equation 2), and then, in block 906, use the parameters in the deterministic pseudo-random pattern algorithm to determine the tone indexes for the subset of M tones to be PRTs. The parameters may be received via the transceiver 410, for example, from a base station 108. Thus, a base station 108 is operable to communicate with the wireless communication device 400 to ensure coordination of the deterministic pseudo-random pattern algorithm on the transmission end and reception end of a communication when the algorithm used includes parameters that may be dynamically selected.

Different combinations of the optional blocks of FIG. 9 may be executed to provide different levels of control of the PAPR reduction technique, as may be appropriate or desirable for particular circumstances or implementations. For example, in some instances, each of the optional blocks of FIG. 9 is executed as part of implementing the block 1004. In other instances, one or a combination of the optional blocks of FIG. 9 is executed as part of implementing the block 1004.

As noted above, in block 1004, the PAPR reduction waveform may be based on the data waveform. For example, the wireless communication device may determine a peak-to-average-power (PAPR) reduction waveform for transmission on the PRTs, based on the data waveform. For example, the wireless communication device 400 may identify a largest peak in a data waveform that is intended for transmission, which may be obtained by the processor 404 from the memory 405 or the user interface 412 via the bus 402. To identify the largest peak, the wireless communication device 400 may perform a peak detection algorithm on the data waveform, which may include the processor 404 iteratively comparing data points of the data waveform until all data points are considered to identify the largest of the data points, or may include the use of another peak detection algorithm. Further, the processor 404 may generate a frequency domain kernel P for the N allocated tones (e.g., where $P_n$ represents the PRT at tone index n, and $$P_n = \begin{cases} 1 & \text{if } n \in \Phi \\ 0 & \text{otherwise} \end{cases},$$

and then define a time-domain kernel waveform p, where p=IFFT(P). As also described above, the processor 404 may then cyclically shift the time-domain kernel waveform p to align the peak of the time-domain kernel waveform p with the largest peak in the data waveform that was identified (see FIG. 6). The wireless communication device 400 may then assign the aligned, circularly shifted version of p ($p^j$) as the PAPR reduction waveform.

By aligning the peaks of the data waveform and the PAPR reduction waveform, the PAPR of a transmission may be reduced more effectively than, for example, when a peak of the PAPR reduction waveform is not aligned with the peak of the data waveform. Thus, even though the subset of N allocated tones selected to be PRTs is random, the alignment of the peaks provides one technique that allows the PAPR reduction waveform generated with the PRTs to be effective in reducing PAPR for transmission of the data waveform. In some examples, the PAPR reduction waveform may be generated using other techniques (e.g., without peak alignment or without circular shifting of the time-domain kernel waveform p).

Further Examples Having a Variety of Features

Example 1: A method, apparatus, and non-transitory computer-readable medium where a wireless communication device receives a resource allocation spanning a set of N tones. The device then transmits a data waveform multiplexed with a peak-to-average-power (PAPR) reduction waveform. The PAPR reduction waveform occupies a subset of the N tones, pseudo-randomly arranged within the resource allocation, and the data waveform occupies another subset of the N tones.

Example 2: A method, apparatus, and non-transitory computer-readable medium of Example 1, where the pseudo-random arrangement of the subset of the N tones within the resource allocation is based on a deterministic pseudo-random pattern generation algorithm, wherein the deterministic pseudo-random pattern generation algorithm comprises a quadratic sampling algorithm that uses a squared variable and resolves to a tone index.

Example 3: A method, apparatus, and non-transitory computer-readable medium of any of Examples 1 to 2, where the pseudo-random arrangement of the subset of the N tones within the resource allocation is based on a deterministic pseudo-random pattern generation algorithm, wherein the deterministic pseudo-random pattern generation algorithm comprises a cubic sampling algorithm that uses a cubed variable and resolves to a tone index.

Example 4: A method, apparatus, and non-transitory computer-readable medium of any of Examples 1 to 3, where the pseudo-random arrangement of the subset of the N tones within the resource allocation is based on a deterministic pseudo-random pattern generation algorithm, wherein the deterministic pseudo-random pattern generation algorithm comprises a Fibonacci-type sampling algorithm that uses a sum of two preceding elements and resolves to a tone index.

Example 5: A method, apparatus, and non-transitory computer-readable medium of any of Examples 1 to 4, where the device further receives parameters for a deterministic pseudo-random pattern generation algorithm, wherein the pseudo-random arrangement of the subset of the N tones within the resource allocation is based on the deterministic pseudo-random pattern generation algorithm.

Example 6: A method, apparatus, and non-transitory computer-readable medium of any of Examples 1 to 5, where the PAPR reduction waveform is based on the data waveform.

Example 7: A method, apparatus, and non-transitory computer-readable medium of any of Examples 1 to 6, where the device further receives a PRT determination algorithm selection parameter and selects the pseudo-random pattern generation algorithm from among a plurality of pseudo-random pattern generation algorithms based on the PRT determination algorithm selection parameter.

Example 8: A method, apparatus, and non-transitory computer-readable medium of any of Examples 1 to 7, where the device further receives a TR On/Off parameter and determines whether to utilize the PAPR reduction waveform for transmission with the data waveform based on the TR On/Off parameter.

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the term "coupled" to refer to a direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
receiving a tone reservation (TR) On/Off parameter;
determining to utilize a peak-to-average-power (PAPR) reduction waveform for transmission with the data waveform based on the TR On/Off parameter;
receiving a resource allocation spanning a set of N tones; and
transmitting a data waveform multiplexed with the PAPR reduction waveform, the PAPR reduction waveform occupying a subset of the N tones, pseudo-randomly arranged within the resource allocation, and the data waveform occupying another subset of the N tones.

2. The method of claim 1, wherein the pseudo-random arrangement of the subset of the N tones within the resource allocation is based on a deterministic pseudo-random pattern generation algorithm, wherein the deterministic pseudo-random pattern generation algorithm comprises a quadratic sampling algorithm that uses a squared variable and resolves to a tone index.

3. The method of claim 1, wherein the pseudo-random arrangement of the subset of the N tones within the resource allocation is based on a deterministic pseudo-random pattern generation algorithm, wherein the deterministic pseudo-random pattern generation algorithm comprises a cubic sampling algorithm that uses a cubed variable and resolves to a tone index.

4. The method of claim 1, wherein the pseudo-random arrangement of the subset of the N tones within the resource allocation is based on a deterministic pseudo-random pattern generation algorithm, wherein the deterministic pseudo-random pattern generation algorithm comprises a Fibonacci-type sampling algorithm that uses a sum of two preceding elements and resolves to a tone index.

5. The method of claim 1, further comprising receiving parameters for a deterministic pseudo-random pattern generation algorithm, wherein the pseudo-random arrangement of the subset of the N tones within the resource allocation is based on the deterministic pseudo-random pattern generation algorithm.

6. The method of claim 1, wherein the PAPR reduction waveform is based on the data waveform.

7. The method of claim 1, further comprising:
receiving a peak reduction (PRT) determination algorithm selection parameter; and
selecting a deterministic pseudo-random pattern generation algorithm from among a plurality of deterministic pseudo-random pattern generation algorithms based on the PRT determination algorithm selection parameter,
wherein the pseudo-random arrangement of the subset of the N tones within the resource allocation is based on the deterministic pseudo-random pattern generation algorithm.

8. An apparatus for wireless communication, comprising:
means for receiving a tone reservation (TR) On/Off parameter;
means for determining to utilize a peak-to-average-power (PAPR) reduction waveform for transmission with the data waveform based on the TR On/Off parameter;
means for receiving a resource allocation spanning a set of N tones; and
means for transmitting a data waveform multiplexed with the PAPR reduction waveform, the PAPR reduction waveform occupying a subset of the N tones, pseudo-randomly arranged within the resource allocation, and the data waveform occupying another subset of the N tones.

9. The apparatus of claim 8, wherein the pseudo-random arrangement of the subset of the N tones within the resource allocation is based on a deterministic pseudo-random pattern generation algorithm, wherein the deterministic pseudo-random pattern generation algorithm comprises a quadratic sampling algorithm that uses a squared variable and resolves to a tone index.

10. The apparatus of claim 8, wherein the pseudo-random arrangement of the subset of the N tones within the resource allocation is based on a deterministic pseudo-random pattern generation algorithm, wherein the deterministic pseudo-random pattern generation algorithm comprises a cubic sampling algorithm that uses a cubed variable and resolves to a tone index.

11. The apparatus of claim 8, wherein the pseudo-random arrangement of the subset of the N tones within the resource allocation is based on a deterministic pseudo-random pattern generation algorithm, wherein the deterministic pseudo-random pattern generation algorithm comprises a Fibonacci-type sampling algorithm that uses a sum of two preceding elements and resolves to a tone index.

12. The apparatus of claim 8, further comprising means for receiving parameters for a deterministic pseudo-random pattern generation algorithm, wherein the pseudo-random arrangement of the subset of the N tones within the resource allocation is based on the deterministic pseudo-random pattern generation algorithm.

13. The apparatus of claim 8, wherein the PAPR reduction waveform is based on the data waveform.

14. The apparatus of claim 8, further comprising:
means for receiving a peak reduction (PRT) determination algorithm selection parameter; and
means for selecting a deterministic pseudo-random pattern generation algorithm from among a plurality of deterministic pseudo-random pattern generation algorithms based on the PRT determination algorithm selection parameter,
wherein the pseudo-random arrangement of the subset of the N tones within the resource allocation is based on the deterministic pseudo-random pattern generation algorithm.

15. A non-transitory computer-readable medium storing computer-executable code, comprising code for causing a wireless communication apparatus to:
receive a tone reservation (TR) On/Off parameter;
determine to utilize a peak-to-average-power (PAPR) reduction waveform for transmission with the data waveform based on the TR On/Off parameter;
receive a resource allocation spanning a set of N tones; and
transmit a data waveform multiplexed with the PAPR reduction waveform, the PAPR reduction waveform occupying a subset of the N tones, pseudo-randomly arranged within the resource allocation, and the data waveform occupying another subset of the N tones.

16. The non-transitory computer-readable medium of claim 15, wherein the pseudo-random arrangement of the subset of the N tones within the resource allocation is based on a deterministic pseudo-random pattern generation algorithm, wherein the deterministic pseudo-random pattern generation algorithm comprises a quadratic sampling algorithm that uses a squared variable and resolves to a tone index.

17. The non-transitory computer-readable medium of claim 15, wherein the pseudo-random arrangement of the subset of the N tones within the resource allocation is based on a deterministic pseudo-random pattern generation algorithm, wherein the deterministic pseudo-random pattern generation algorithm comprises a cubic sampling algorithm that uses a cubed variable and resolves to a tone index.

18. The non-transitory computer-readable medium of claim 15, wherein the pseudo-random arrangement of the subset of the N tones within the resource allocation is based on a deterministic pseudo-random pattern generation algorithm, wherein the deterministic pseudo-random pattern generation algorithm comprises a Fibonacci-type sampling algorithm that uses a sum of two preceding elements and resolves to a tone index.

19. The non-transitory computer-readable medium of claim 15, wherein the computer-executable code further comprises code for causing a wireless communication apparatus to:
receive a peak reduction (PRT) determination algorithm selection parameter; and
select a deterministic pseudo-random pattern generation algorithm from among a plurality of deterministic pseudo-random pattern generation algorithms based on the PRT determination algorithm selection parameter,
wherein the pseudo-random arrangement of the subset of the N tones within the resource allocation is based on the deterministic pseudo-random pattern generation algorithm.

20. An apparatus for wireless communication, comprising:
a processor;
a transceiver communicatively coupled to the processor; and
a memory communicatively coupled to the processor,
wherein the processor and the memory are configured to:
receive a tone reservation (TR) On/Off parameter;
determine to utilize a peak-to-average-power (PAPR) reduction waveform for transmission with the data waveform based on the TR On/Off parameter;

receive, via the transceiver, a resource allocation spanning a set of N tones; and transmit, via the transceiver, a data waveform multiplexed with the PAPR reduction waveform, the PAPR reduction waveform occupying a subset of the N tones, pseudo-randomly arranged within the resource allocation, and the data waveform occupying another subset of the N tones.

21. The apparatus of claim 20, wherein the pseudo-random arrangement of the subset of the N tones within the resource allocation is based on a deterministic pseudo-random pattern generation algorithm, wherein the deterministic pseudo-random pattern generation algorithm comprises a quadratic sampling algorithm that uses a squared variable and resolves to a tone index.

22. The apparatus of claim 20, wherein the pseudo-random arrangement of the subset of the N tones within the resource allocation is based on a deterministic pseudo-random pattern generation algorithm, wherein the deterministic pseudo-random pattern generation algorithm comprises a cubic sampling algorithm that uses a cubed variable and resolves to a tone index.

23. The apparatus of claim 20, wherein the pseudo-random arrangement of the subset of the N tones within the resource allocation is based on a deterministic pseudo-random pattern generation algorithm, wherein the deterministic pseudo-random pattern generation algorithm comprises a Fibonacci-type sampling algorithm that uses a sum of two preceding elements and resolves to a tone index.

24. The apparatus of claim 20, wherein the processor and the memory are further configured to receive, via the transceiver, parameters for a deterministic pseudo-random pattern generation algorithm, wherein the pseudo-random arrangement of the subset of the N tones within the resource allocation is based on the deterministic pseudo-random pattern generation algorithm.

25. The apparatus of claim 20, wherein the PAPR reduction waveform is based on the data waveform.

26. The apparatus of claim 20, wherein the processor and the memory are further configured to:

receive, via the transceiver, a peak reduction (PRT) determination algorithm selection parameter; and select a deterministic pseudo-random pattern generation algorithm from among a plurality of deterministic pseudo-random pattern generation algorithms based on the PRT determination algorithm selection parameter, wherein the pseudo-random arrangement of the subset of the N tones within the resource allocation is based on the deterministic pseudo-random pattern generation algorithm.

* * * * *